(12) United States Patent
Paul et al.

(10) Patent No.: US 10,412,440 B2
(45) Date of Patent: Sep. 10, 2019

(54) MEDIA AND DATA SYNCHRONIZATION SYSTEM

(75) Inventors: Ross Alan Paul, Brooklyn, NY (US); Joseph Anthony Inzerillo, New York, NY (US); Kevin Leon Durham, Raleigh, NC (US); Robert A. Bowman, Westport, CT (US)

(73) Assignee: MLB ADVANCED MEDIA, L.P., New York, NY (US)

( * ) Notice: Subject to any disclaimer, the term of this patent is extended or adjusted under 35 U.S.C. 154(b) by 283 days.

(21) Appl. No.: 12/730,699

(22) Filed: Mar. 24, 2010

(65) Prior Publication Data

US 2011/0238853 A1 Sep. 29, 2011

(51) Int. Cl.
| | |
|---|---|
| *G06F 15/16* | (2006.01) |
| *H04N 21/43* | (2011.01) |
| *H04N 21/81* | (2011.01) |
| *H04N 5/232* | (2006.01) |
| *H04N 5/04* | (2006.01) |
| *G06F 3/01* | (2006.01) |
| *G06F 3/048* | (2013.01) |
| *H04N 21/2187* | (2011.01) |
| *H04N 21/462* | (2011.01) |
| *G06K 9/00* | (2006.01) |

(Continued)

(52) U.S. Cl.
CPC ..... *H04N 21/4307* (2013.01); *H04N 21/8133* (2013.01); *G06F 3/01* (2013.01); *G06F 3/048* (2013.01); *G06K 9/00671* (2013.01); *G06K 9/00684* (2013.01); *H04L 65/403* (2013.01); *H04N 5/04* (2013.01); *H04N 5/23206* (2013.01); *H04N 19/46* (2014.11); *H04N 21/2187* (2013.01); *H04N 21/4622* (2013.01)

(58) Field of Classification Search
CPC ....... G06F 3/01; G06F 3/048; H04N 5/23206; H04N 21/2187; H04N 21/4622; H04N 19/46; H04N 5/04; H04N 21/4307; H04N 21/8133; H04L 65/403; G06K 9/00671; G06K 9/00684
USPC .......................................... 709/231
See application file for complete search history.

(56) References Cited

U.S. PATENT DOCUMENTS

| | | | |
|---|---|---|---|
| 6,182,084 B1 * | 1/2001 | Cockrell et al. | |
| 6,193,610 B1 * | 2/2001 | Junkin | 463/40 |

(Continued)

OTHER PUBLICATIONS

H. Abe, H. Shigeno and K. Okada, "Media Synchronization Method for Video Hypermedia Application Based on Extended Event Model," 2006 IEEE International Conference on Multimedia and Expo, Toronto, Ont., 2006, pp. 1289-1292. (Year: 2006).*

*Primary Examiner* — Taylor A Elfervig
(74) *Attorney, Agent, or Firm* — Foley & Lardner LLP

(57) ABSTRACT

A method for synchronizing information includes generating media corresponding to a program. One or more media timestamps are associated with the media. Data corresponding to the program is also generated. One or more data timestamps are associated with the data. At least a portion of the media is provided for presentation on a computing device. A current media timestamp corresponding to currently playing media is received. Data having a greatest data timestamp that is less than or equal to the current media timestamp is identified based at least in part on a comparison of the current media timestamp to the one or more data timestamps. The identified data is provided for presentation on the computing device.

22 Claims, 3 Drawing Sheets

(51) Int. Cl.
*H04L 29/06* (2006.01)
*H04N 19/46* (2014.01)

(56) References Cited

U.S. PATENT DOCUMENTS

| | | | | |
|---|---|---|---|---|
| 7,796,155 | B1* | 9/2010 | Neely, III | G06K 9/00771 345/418 |
| 9,094,615 | B2* | 7/2015 | Aman | G01S 3/7864 |
| 2003/0177503 | A1* | 9/2003 | Sull | G06F 17/30796 725/112 |
| 2003/0182620 | A1* | 9/2003 | Errico | H04N 21/23614 715/202 |
| 2003/0229679 | A1* | 12/2003 | Yoo | G11B 27/105 709/217 |
| 2004/0170383 | A1* | 9/2004 | Mazur | G11B 27/034 386/241 |
| 2005/0008261 | A1* | 1/2005 | Wolff | H04N 21/8455 382/305 |
| 2007/0121534 | A1* | 5/2007 | James | H04W 4/02 370/313 |
| 2007/0250848 | A1* | 10/2007 | Gorti | H04H 20/38 725/14 |
| 2007/0290878 | A1* | 12/2007 | Maggio | 340/825.24 |
| 2008/0066100 | A1* | 3/2008 | Brodersen | G06F 17/30855 725/35 |
| 2009/0006488 | A1* | 1/2009 | Lindahl | H04N 21/242 |
| 2009/0205008 | A1* | 8/2009 | Wollmershauser | H04N 21/242 725/131 |
| 2010/0235740 | A1* | 9/2010 | Friedlander | H04N 5/44513 715/716 |
| 2010/0283630 | A1* | 11/2010 | Alonso | 340/870.11 |
| 2011/0010623 | A1* | 1/2011 | Vanslette | G06F 3/0485 715/704 |
| 2011/0069230 | A1* | 3/2011 | Polumbus | G11B 27/10 348/468 |
| 2011/0081965 | A1* | 4/2011 | Klein | A63F 13/12 463/31 |
| 2011/0083073 | A1* | 4/2011 | Atkins | H04N 21/4147 715/704 |
| 2011/0131596 | A1* | 6/2011 | Amsterdam | H04H 60/33 725/14 |
| 2011/0208787 | A1* | 8/2011 | Sidy | G06F 17/30867 707/809 |
| 2011/0221962 | A1* | 9/2011 | Khosravy et al. | 348/563 |
| 2012/0027379 | A1* | 2/2012 | Thompson | H04N 5/76 386/241 |

* cited by examiner

MEDIA AND DATA SYNCHRONIZATION SYSTEM

FIELD

The subject of the disclosure relates generally to a system for synchronizing media with data. More specifically, the disclosure relates to a system, method, and computer-readable medium for intelligently using timestamp information to synchronize the presentation of media and data.

BACKGROUND

Sporting events such as baseball, football, hockey, basketball, soccer, etc. are often presented in audio form over radio frequencies, in audiovisual form over television networks, and in audio, visual, and or audiovisual form over networks such as the Internet. In addition to video and audio corresponding to the sporting event, statistical and other information may also be presented. In the context of baseball, such additional information may include a score of the game, a number of outs, a strike count, a name of the pitcher, a name of the batter, a textual representation of a result of a pitch, a batting average of the batter, an earned run average (ERA) of the pitcher, a symbolic representation of the game, etc.

SUMMARY

A method for synchronizing information includes generating media corresponding to a program. One or more media timestamps are associated with the media. Data corresponding to the program is also generated. One or more data timestamps are associated with the data. At least a portion of the media is provided for presentation on a computing device. A current media timestamp corresponding to currently playing media is received. Data having a greatest data timestamp that is less than or equal to the current media timestamp is identified based at least in part on a comparison of the current media timestamp to the one or more data timestamps. The identified data is provided for presentation on the computing device.

A system for synchronizing information includes a processor and a server in communication with the processor. The processor is configured to associate one or more media timestamps with media corresponding to a program. The processor is also configured to associate one or more data timestamps with data corresponding to the program. The processor is further configured to identify, based at least in part on a comparison of a current media timestamp to the one or more data timestamps, data having a greatest data timestamp that is less than or equal to the current media timestamp. The current media timestamp corresponds to currently playing media on a computing device. The server is configured to provide at least a portion of the media for presentation on the computing device. The server is also configured to receive the current media timestamp. The server is further configured to provide the identified data for presentation on the computing device.

A method for presenting a program includes receiving, with a receiver of a computing device, media corresponding to a program. One or more media timestamps are associated with the media. The media is presented through a media player application. A current media timestamp is transmitted to a system that provided the media. The current media timestamp corresponds to currently playing media. In response to the transmitting of the current media timestamp, data corresponding to the currently playing media is received. A data timestamp associated with the received data comprises a greatest data timestamp that is less than or equal to the current media timestamp.

Other principal features and advantages will become apparent to those skilled in the art upon review of the following drawings, the detailed description, and the appended claims.

BRIEF DESCRIPTION OF THE DRAWINGS

Illustrative embodiments will hereafter be described with reference to the accompanying drawings.

DETAILED DESCRIPTION

In traditional media presentation systems, media such as an audiovisual presentation may be presented in conjunction with textual and/or graphical data corresponding to the audiovisual presentation. Such data often includes an indication of what is occurring in the media presentation. In systems where the media and the data result from distinct feeds, data corresponding to an event is often presented prior to or well after the audiovisual media corresponding to the event. The inventors have perceived that such premature or late presentation of an outcome of the event is undesirable and can spoil the audiovisual experience of the event for individuals that are viewing and/or listening to the audiovisual presentation. Described herein are methods, systems, and computer-readable media for synchronizing the presentation and/or playback of media and data. The synchronization of the media and data can occur while a program upon which the media and data are based is on-going (i.e., live) and/or after the program has concluded (i.e., archived).

Figure 1:
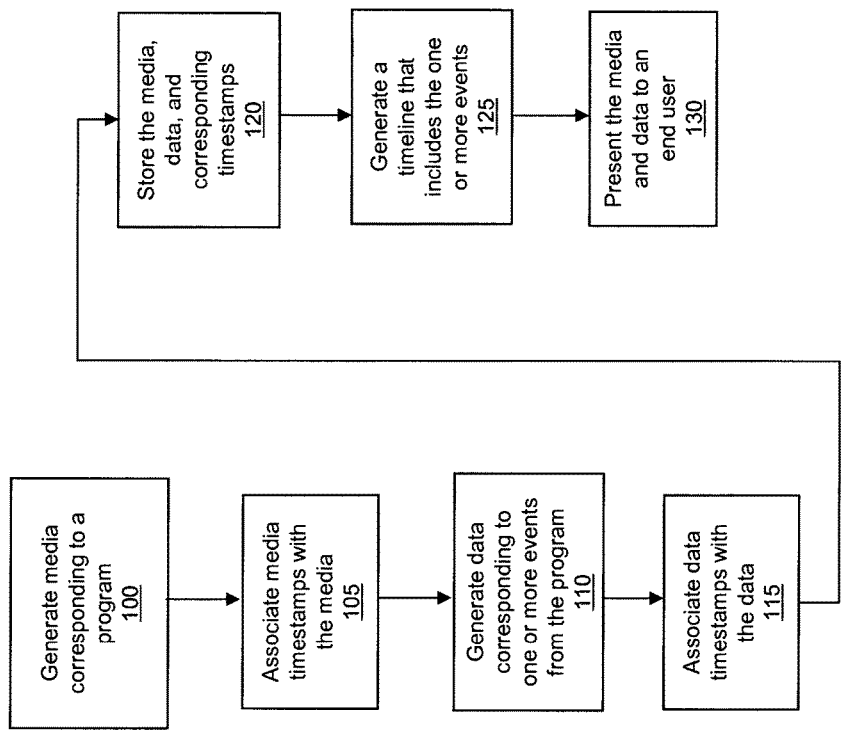
FIG. 1 is a flow diagram illustrating operations performed by a media and data synchronization system in accordance with an illustrative embodiment.

FIG. 1 is a flow diagram illustrating operations performed by a media and data synchronization system in accordance with an illustrative embodiment. In alternative embodiments, fewer, additional, and/or different operations may be performed. In an operation 100, the media and data synchronization system (or system) generates media corresponding to a program. The media, which includes one or more events from the program, can correspond to the entire program. Alternatively, the media may include one or more events that correspond to only a portion of the program. In an illustrative embodiment, the media can be audio information only, video information only, graphical information used to form a visual simulation or representation of the event, and/or audiovisual information. The program can be a sporting event such as a baseball game, a basketball game, a football game, a soccer game, a race, etc. An event can refer to at least a portion of the program. In the context of a baseball game, the event can be a thrown pitch, a stolen base, an error, a meeting at the pitcher's mound, and/or any other occurrence in or related to the baseball game. In the context of a football game, the event can be a kickoff, a snap, a timeout, a penalty, and/or any other occurrence in or related to the football game. The program may also be a competition such as a spelling bee, a documentary, a reality television show, a game show, and/or any other program which may be broadcast in some form for end users to experience.

The media can be generated at least in part by one or more video cameras and/or other recording devices that are used to capture the program. The media can also be generated at least in part by a microphone that is configured to capture audio commentary from announcers that are commentating the event. In an illustrative embodiment, the media can be video only, audio only, or a combination of video and audio. Any type(s) of video cameras, microphones, and/or other capture devices known to those of skill in the art may be used. As an example, the program in which the event occurs can be a baseball game and a given event can be the throwing of a pitch in the baseball game. The thrown pitch can be captured by a plurality of video cameras that are positioned at different angles and that are used to generate the media corresponding to the pitch. Audio commentary corresponding to the thrown pitch may also be captured using one or more microphones.

In an operation 105, the system associates media timestamps with the media. The media timestamps can be continuously, periodically, or intermittently inserted into or otherwise associated with the media, depending on the embodiment. With respect to audio media in which the media timestamps are continuous, the media timestamps can be similar to a clock or counter that progresses for the entire length of the audio media. With respect to video or audiovisual media in which the media timestamps are continuous, each video frame may be associated with at least one media timestamp. Periodic timestamp association can be used to associate a media timestamp with the audio, video, and/or audiovisual media every 1 second, every 2 seconds, every 5 seconds, every 10 seconds, etc. Intermittent timestamp association can be used to associate a media timestamp with the audio, video, and/or audiovisual media aperiodically throughout the media based on the occurrence of events within the program. Intermittent timestamp association is described in more detail with reference to FIG. 2.

In an embodiment in which the media is video, the media timestamps can be included as a native part of the video stream. The media timestamps may also be associated with the media in the form of metadata that is encoded into the media by any method known to those of skill in the art. The media may also be tagged with the media timestamps according to any method known to those of skill in the art. In one embodiment, a media timestamp for video media can have the following format: hh:mm:ss:ff, where hh is the hour at which the media occurs, mm is the minute at which the media occurs, ss is the second at which the media occurs, and ff is the frame of the media (within the second). Depending on the capture device used, the frame rate may be 30 frames per second, 50 frames per second, 100 frames per second, etc. If the media does not include video (i.e., if the media is audio), the media timestamps may include only the hour, minute, and/or second at which the media occurs. In one embodiment, the media timestamps may be synchronized with a clock that tracks the time of day. Alternatively, the media timestamps may be independent of the actual time of the day. The media timestamps may also include a date (day, month, and/or year) on which the event is occurring.

In an illustrative embodiment, the media timestamps are generated by a timestamp (or time code) generator. The timestamp generator can be a standalone timekeeper which is accessed by a processor or other system component that is configured to associate the media timestamps with the media. Alternatively, the timestamp generator may be incorporated into a media capture device such as a video recorder for direct incorporation into the video stream. In an embodiment in which the media timestamps are encoded into the media as metadata, the timestamp generator can be configured to generate the metadata and encode the metadata into the media. In an alternative embodiment, the timestamp generator may only generate the media timestamps, and a different system component such as a processor, software, etc. may associate the media timestamps with the media.

In an operation 110, data corresponding to one or more events from the program is generated. In an illustrative embodiment, the data can be generated based at least in part on an outcome of the events. The data can also be gathered from a database or other source that includes statistical information. In one embodiment, the data can be a textual description and/or a graphical description or representation of a given event. In the context of a baseball game in which the event is a thrown pitch, the data can be an indication of whether the thrown pitch resulted in a strike, a ball, a foul ball, a base hit, a home run, a struck batter, a bunt, etc. The data can also include a box score, strike count, inning number, batter name, pitcher name, and/or other game information which may be updated as a result of the event. The data can also include player information such as an earned run average, batting average, career averages, and/or other statistics. In one embodiment, gathered statistical information may be updated based on the outcome of the event. As an example, an obtained batting average for a batter may be appropriately lowered if the result of the event is a strikeout.

The data can also be graphical data that is used to present a simulation of the event. Continuing the example of a baseball game, the data may be at least a portion of a graphical simulation of the game. The graphical simulation can include icons/markers to indicate player names and positions around the field, icons to indicate what bases are occupied and which players are on those bases, a textual or symbolic representation of the strike count, the inning number, whether it is the top or bottom of the inning, weather conditions, etc.

In an illustrative embodiment, the data is generated at least in part by a portion of the system that monitors the program and/or by one or more individuals that monitor the program. In the context of a baseball game, a pitch tracker can be used to monitor pitches thrown during the game. The pitch tracker, which can include software, a video camera, a speed sensor, an acceleration sensor, a radar sensor, etc., can be used to obtain information regarding the pitch such as the initial speed, end speed, acceleration, and breaking distance of the ball. Any of the information generated by the pitch tracker or other game monitoring system may be used by a stringer application to automatically generate the data. The stringer application can refer to a software application that monitors the game and uses the information from the pitch tracker to generate statistical information, event outcomes, and other information corresponding to the game. The stringer application can also receive inputs from a stringer regarding outcomes of events and statistics. The stinger is an individual who watches and monitors the game. At least a portion of the data corresponding to the game may be generated by and/or originate from the stringer application.

In an operation 115, data timestamps are associated with the data. In an illustrative embodiment, the data timestamps can have the same format as the media timestamps associated with the media. Alternatively, a different format may be used for the data timestamps. The data timestamps can be generated by the same timestamp (or time code) generator that is used to generate media timestamps for the media. Alternatively, a separate timestamp generator may be used to generate data timestamps. If a separate timestamp generator is used for the data, the data timestamp generator can be synchronized with the media timestamp generator.

A data timestamp for an event can correspond to a beginning of the event, an end of the event, or a point during the event. As an example in which the event is a baseball pitch, the data timestamp can correspond to a wind up of the pitcher, a release of the ball from the pitcher's hand, a catch of the pitch by the catcher, a signal from the umpire, an end result of the play, etc. In an illustrative embodiment, media corresponding to the event can include a plurality of timestamps covering the duration of the event, and data corresponding to the event can be associated with a single timestamp relative to the event. The data timestamps can be associated with events as metadata that is encoded into the data, as markers encoded into the data, and/or by any other data association method known to those of skill in the art.

In one embodiment in which the program is a baseball game, at least a portion of the data timestamps are generated by the pitch tracker that monitors the game. As described above, the pitch tracker monitors pitches thrown during the game to identify ball speed, ball acceleration, etc. The pitch tracker provides the monitored information to the system for storage, manipulation, and/or use by the stringer application. The data timestamp associated with the data corresponding to the pitch (i.e., the event) can be the time (according to the timestamp generator) at which the information is received from the pitch tracker. Alternatively, the data timestamp associated with the data corresponding to the pitch may be the time (according to the timestamp generator) at which the pitch tracker generates the information or the time at which the information received from the pitch tracker is processed by the system. In one embodiment, the data timestamp associated with the data corresponding to the pitch can be the time (according to the timestamp generator) at which the stringer enters the result of the pitch into the stringer application.

In an illustrative embodiment, operations 105 and 110 are performed in parallel with operations 110 and 115. In an operation 120, the media, data, and corresponding timestamps are stored. The files can be stored in a remote database, in local system memory, in cache memory, and/or in any other data repository. The media and media timestamps may be stored separately from the data and data timestamps. Alternatively, the media, media timestamps, data, and data timestamps may be stored together. In one embodiment, at least the data and data timestamps are stored in a cache memory such that data identified as corresponding to media being presented can be rapidly retrieved by the system for provision to an end user. In an illustrative embodiment, the stored media and data can be used to form an archive such that the program and its events can be played back by a user at a future time and/or date. In one embodiment, the media, data, and associated timestamps may be stored as they are generated. Such storage can occur prior to, after, or simultaneously with distribution of the media and data to end users.

In an operation 125, a timeline of the program is generated that includes the one or more events. Once generated, the timeline can be presented to end users for full or selective playback of the program that includes the event. As an example, the timeline can be implemented as links associated with each event that occurs during a baseball game. Upon selection of a link corresponding to a pitch thrown in the third inning, the end user can automatically view the media corresponding to that pitch and/or the data corresponding to that pitch. The media and data corresponding to the pitch are linked based on their associated timestamps, and the selected portion of the timeline is also linked to at least the media timestamp corresponding to the selected media. The end user can then continue to watch the baseball game going forward from that point, or the end user can select a different link to view the media and/or data for a different event from the game.

In an alternative embodiment, the timeline may include only important events from the program as determined by an individual or a software program. In the context of baseball, the timeline for such an embodiment may include a link to only pitches that result in a base hit, stolen bases, etc. The timeline may also be broken down by program segments such as innings so that the end user can watch the game starting in any inning. Regardless of whether the timeline includes all events or only important events, in an illustrative embodiment, the timeline may be generated, updated, and presented to end users while the program is going on (i.e., live). In an alternative embodiment, the timeline may not be generated or presented to end users until after the conclusion of the program.

In one embodiment, a clickable box score may also be generated. In the context of a baseball game, the box score can refer to a game summary in the form of a table, chart, graph, etc. that is broken down by players, and that includes information regarding the performance of the players. As an example, the box score may indicate that a given player had two hits, one strikeout, and one run batted in (RBI) during the game. Any other statistics such as errors, walks (or base on balls), home runs, runs, times that a player was left on base, etc. may also be included in the box score. The clickable box score allows the end user to click on information from the box score so that the end user is able to view the media and data corresponding to that information. In an illustrative embodiment, the clickable portions of the box score are linked to the media timestamps of the media corresponding to those portions or events. The data is presented along with the media based on the timestamp(s) associated with the presented media. As an example, clicking on the indication of an RBI hit by a given player provides the end user with a presentation of the media and data corresponding to the play from the game during which that RBI occurred. If the given player had multiple RBIs during the game, the clickable box score can allow the end user to select specific RBIs (based on the inning in which they occurred, the time at which they occurred, etc.), or the clickable box score may automatically present the multiple RBIs in succession. In an illustrative embodiment, the clickable box score may be generated, updated, and presented to end users while the program is going on (i.e., live). In an alternative embodiment, the clickable box score may not be generated or presented to end users until after the conclusion of the program.

In an operation 130, the media and data are presented to an end user. The media and data can be presented in real time as the program is occurring, in the form of an archived presentation after the program has concluded, in the form of a timeline as described above, and/or in the form of a clickable box score. In an illustrative embodiment, the data timestamps corresponding to data from the program and media timestamps corresponding to media from the program are used during presentation or playback of the program to the end user to ensure that the data is synchronized with the media. As such, data is not presented to the end user unless the data timestamp corresponding to the data is the greatest (temporally or sequentially) timestamp that is less than or equal to the media timestamp of media that is currently being presented to the end user. The timestamp comparison and coordination, which is described in more detail with reference to FIG. 2, can be performed by the system in cooperation with a media player through which the end user experiences the program.

Figure 2:
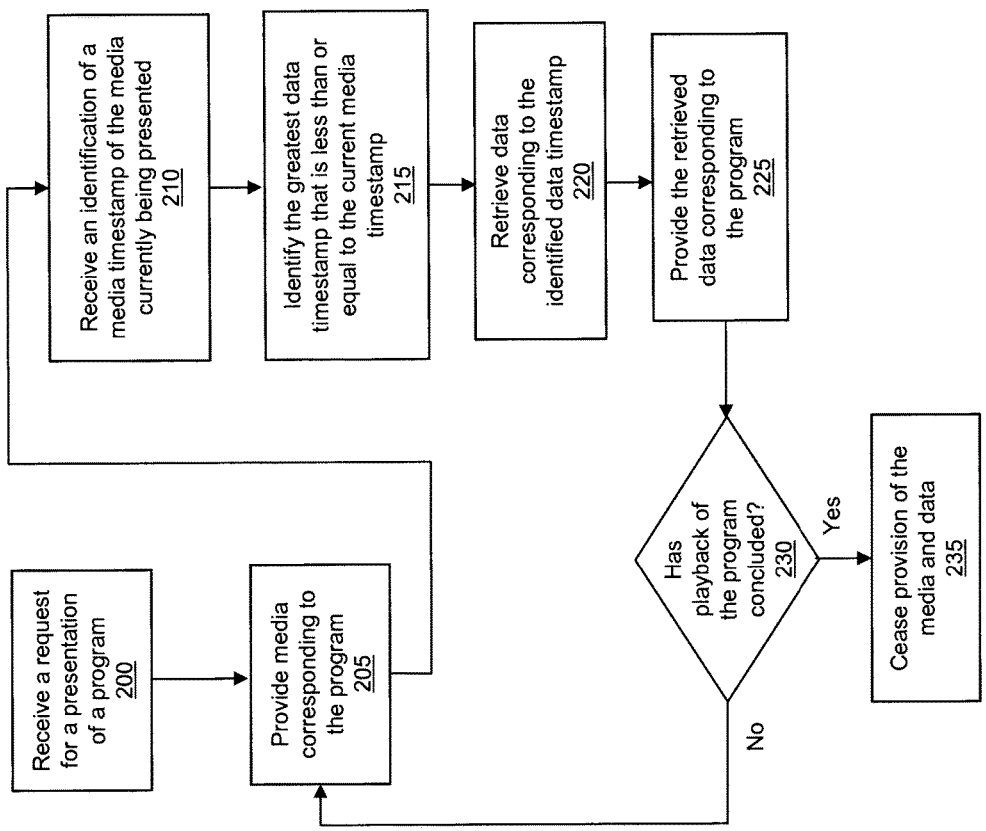
FIG. 2 is a flow diagram illustrating operations performed during distribution and presentation of a program in accordance with an illustrative embodiment.

FIG. 2 is a flow diagram illustrating operations performed during distribution and presentation of a program in accordance with an illustrative embodiment. In alternative embodiments, fewer, additional, and/or different operations may be performed. The operations described with reference to FIG. 2 may be performed at least in part through cooperation with a media player software application that is used by an end user to experience the program. In an alternative embodiment, the operations of FIG. 2 may be performed independent of the media player.

In an operation 200, a request for a presentation of a program is received. The request can be for presentation of the entire program. Alternatively, the request may be for the presentation of one or more portions of the media corresponding to a generated timeline or clickable box score. In an illustrative embodiment, the request originates from a computing device of an end user and is received by the data and media synchronization system (or system) described herein. The computing device of the end user can be a laptop computer, a desktop computer, a cellular phone, a gaming device, a personal digital assistant, and/or any other device capable of receiving information through a network. The request can be received through a wired or wireless network by any method known to those of skill in the art. The end user can generate the request through a network browser and/or through a media player application, depending on the embodiment.

In an operation 205, media corresponding to the program is provided to the computing device of the end user in response to the request. The provided media includes media timestamps. As described with reference to FIG. 1, the media timestamps may be a native part of the media, may be implemented as markers encoded into the media, and/or may be encoded into the media as metadata, depending on the embodiment. In an illustrative embodiment, the media is received at the computing device of the end user and presented to the end user on a display and/or through speakers with a media player application. The media player can include software and/or hardware, and may reside at least in part on the computing device of the end user. Alternatively, the media player be provided to the end user through a network browser as known to those of skill in the art. The media can be presented to the end user in real time as the program (such as a sporting event, etc.) is going on, or after the program has been completed. In one embodiment, the media can be presented in conjunction with a linked timeline and/or a clickable box score so that the end user can jump to any desired location in the program.

In an operation 210, an identification of a media timestamp of the media currently being presented is received by the system. In an illustrative embodiment, the identification is received from the media player that is presenting the media to the end user. In one embodiment, the media player is configured to provide the current media timestamp to the system periodically. As such, the identification of the media timestamp is received periodically by the system, such as every 1 second, every 2 seconds, every 5 seconds, every 10 seconds, etc.

In one embodiment, the media player may be configured to refrain from providing the current media timestamp during times of the program at which subsequent data corresponding to the media will not be present. As an example, the media player can determine when subsequent data will not be present based on an event type of the event that most recently occurred in the program. If the event is a second strike, the media player may send the current media timestamp once every five seconds following the strike based on the assumption that data will be forthcoming regarding the next pitch thrown. However, if the event signifies the end of an inning, the media player may refrain from providing the current media timestamp for 30 seconds, 1 minute, two minutes, or some other predetermined time to account for a commercial break in between innings. If the end user pauses the presentation of the program, the media player may also be configured to not provide the current media timestamp (which will remain static while program is paused) until the end user resumes the presentation.

In one embodiment, the system may be configured to insert media timestamps into the media only at positions of the media for which new data is or may be generated. As an example, a single timestamp (or marker) may be inserted into the media directly following various events that occur during the program. In such an embodiment, the media player can be configured to provide the identification of the current media timestamp to the system each time that a timestamp occurs in the media. In the context of a baseball game, a media timestamp may be inserted into the media at a given time following each pitch such that data corresponding to the pitch can be obtained by the media player. During a portion of the media corresponding to a commercial break, no media timestamps are included in the media because there should be no occurrence in the game that results in new data during the commercial break. As a result, the media player will not provide identifications of timestamps to the system during the commercial break.

In an operation 215, the system identifies the greatest (temporally or sequentially) data timestamp that is less than or equal to the current media timestamp identified in operation 210. As a result, data corresponding to an event that occurs in the program is not presented prior to the media corresponding to the event, and the presentation of the media is not spoiled for the end user. As described with reference to FIG. 1, the data timestamps may be included as metadata encoded into or otherwise associated with the actual data. Alternatively, the data timestamps may be encoded into or otherwise associated with the data as markers. In an illustrative embodiment, the comparison of the current media timestamp to the data timestamp(s) associated with the program is performed by the system at a remote location from the computing device of the end user. In an alternative embodiment, the comparison may be performed at least in part by the media player that is presenting the media.

In an illustrative embodiment, the current media timestamp is compared to all existing data timestamps associated with the program. Alternatively, the current media timestamp may only be compared with one or a fraction of the data timestamps associated with the program. As an example in which the end user has not rewound the program to an earlier point, the system may only compare the current media timestamp to the next sequential data timestamp (i.e., the data timestamp that comes directly subsequent to the previously identified data timestamp) to determine whether that next data timestamp is less than or equal to the current media timestamp.

In an operation 220, the system retrieves the data corresponding to the data timestamp identified in operation 215. In an illustrative embodiment, the data and/or data timestamps are stored in a cache memory such that the system can quickly retrieve the data for provision to the computing device of the end user. In an illustrative embodiment, the data is cached by the system at a location that is remote from the computing device of the end user. In an alternative embodiment, the data may be cached or otherwise stored at the computing device of the end user. The data and/or data timestamps may also be stored in any other type(s) of computer accessible memory known to those of skill in the art.

In an operation 225, the retrieved data corresponding to the program is provided for presentation to the end user. As with the media, the data can be provided through a wired or wireless network by any method known to those of skill in the art. In one embodiment, the data can be presented as an overlay of the media. As an example, the media may be presented as video and the data may be a box score overlay that includes results of the most recent event that occurred, along with a score of the game, statistical information, etc. In another embodiment in which the media is audio only, video only, or audiovisual, the data may be presented in the form of a graphical simulation that identifies at least a result of the most recent event that occurred. As an example, the graphical simulation may indicate that a runner is on base after a hit, that a runner has advanced a base after a stolen base, that a pitcher change has occurred, etc. The graphical simulation may also include textual information such as player names, the score of the game, the strike count, etc. The graphical simulation can be an overlay that is presented over the media, or the graphical simulation can be presented in a separate portion of a window in which the media is presented. If the media is audio only, the graphical simulation may be the primary information presented in a media player window. In an alternative embodiment in which the media includes video, the data may be incorporated into the media as chyrons as known to those of skill in the art.

In an operation 230, a determination is made regarding whether the playback of the program has concluded. Playback can be determined as concluded when the entire program has been presented in its entirety. Playback may also be concluded when the presentation of a selected portion of the program (i.e., from a timeline, a clickable box score, etc.) has concluded. Playback may also be concluded if the end user closes or otherwise ends the browser and/or media player through which the program is being presented. If it is determined that playback of the program has concluded, media and data provision is ceased in an operation 235. If it is determined that playback of the program has not concluded, the system continues to cycle through operations 205-230 until such a determination is made in operation 230.

FIG. 2 was described primarily with reference to operations performed by a system located remote from the computing device of the end user. In an alternative embodiment, one or more of the operations of FIG. 2 may be performed by the computing device of the end user and/or the media player or other component that enables the end user to experience the presentation of the program on a computer monitor or television, through speakers, etc. As indicated above, the media player may be a standalone application and/or hardware that is maintained on the computing device of the end user or a server based player that is accessed by the end user through a network browser. As an example, the end user computing device and/or media player may be configured to identify the appropriate data to be presented based on a comparison of the current media timestamp to data timestamps and retrieve the identified data from a local or remote memory component.

In one embodiment, the data may include information which is not directly related to the program. As one example, the system may monitor postings on social networking sites such as Twitter™ to identify the volume and/or content of posts regarding events that occur during the program. The monitored activity can be associated with a data timestamp and can be presented as additional data along with the program-based data and the media corresponding to the program. Similarly, content and/or volume of text messages, e-mails, etc. received by the system may also be associated with timestamps for presentation as data along with the media corresponding to the program. The timestamps of such additional data can be used to ensure that the data is presented at the appropriate time with the program-based data and the media.

In an illustrative example of the system, the program of interest may be a baseball game, the media may be an audio only, video only, or audiovisual presentation of the baseball game, and the data can correspond to the result of events in the baseball game and statistics regarding the baseball game. As described above, the events can be a pitch, a player change, an error, a stolen base, a meeting at the mound, etc. The data can be presented as part of a simulation or representation of the baseball game and/or as part of a box score that includes the inning number, the strike count, player names, statistical information, and/or other information of interest as known to those of skill in the art.

The media is captured through one or more microphones that capture announcer commentary regarding the game and/or through one or more video cameras that are recording the baseball game. A timestamp generator is used to generate timestamps that are associated with at least a portion of the media. In an embodiment in which the media includes a distinct video feed of the game and a distinct audio commentary feed of the game, the timestamps can be associated with at least the video feed. The data can be generated automatically by a stringer application that automatically monitors the game, that receives data from a stringer who is viewing and monitoring the game, and/or that receives statistical information regarding the game and the players in the game. The timestamp generator (or a separate timestamp generator synchronized with the media timestamp generator) is used to generate timestamps for the data as described above.

An end user can request to view the game through a computing device such as a personal computer, cellular phone, etc. In an illustrative embodiment, the end user places the request through a network browser that is used to access a website through which the game is accessible. If the game is ongoing, the end user may only have the option of watching the game in real time. Alternatively, the end user may be presented with a timeline or a clickable box score of an ongoing game so that the end user can watch any portion(s) of the game which have already occurred. If the game has concluded, the end user can be presented with a complete timeline and/or clickable box score of the game which the end user can utilize to access any desired portions of the game.

Media corresponding to the game can be presented on the computing device of the end user through a media player. As described above, the media player may reside locally on the end user computing device, or may be accessed by the computing device through a network browser. The media player receives the media and presents it to the end user. The media player also identifies a current media timestamp, provides the current media timestamp to the system, receives appropriate data based on the current media timestamp, and presents the data to the end user in conjunction with the media. In one embodiment, the media and data may be presented to the end user on a television monitor through a set-top box or direct cable connection. In an embodiment in which a set-top box is used, the set-top box may perform any of the operations of the media player and/or the system to ensure that the appropriate data is presented with the media that is currently being played.

In an illustrative embodiment, the end user can pause a program, fast forward a program which is not being received in real time, and/or rewind a program. The end user can perform such navigation both in an embodiment in which the media and data are generated and presented while the program is on-going (i.e., live) and in an embodiment in which the media and/or data are not presented until after conclusion of the program. When the program is paused, the media player and system do not update the data being presented until playback resumes. When the program is rewound or fast forwarded, the media player can be configured to transmit the current media timestamps to the system while the program is being rewound or fast forwarded such that the data presented during rewinding and fast forwarding remains accurate and in accordance with the media. In an alternative embodiment, data may not be presented or may not be updated while the program is actually being fast forwarded or rewound. In such an embodiment, the data is updated to correspond to the media once the end user is done rewinding or fast forwarding and normal playback commences.

Figure 3:
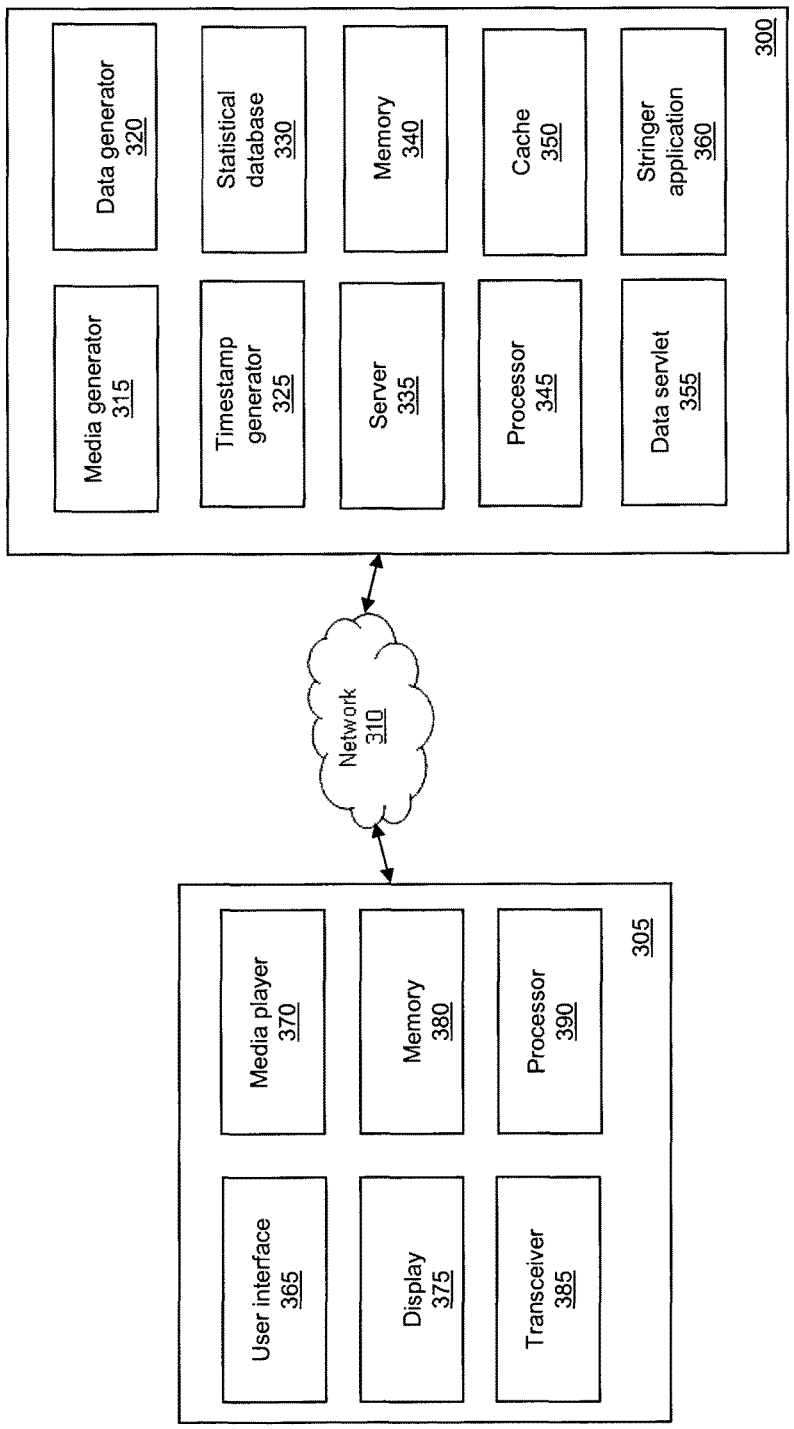
FIG. 3 is a block diagram illustrating a media and data synchronization system in accordance with an illustrative embodiment.

FIG. 3 is a block diagram illustrating a media and data synchronization system 300 in accordance with an illustrative embodiment. In alternative embodiments, fewer, additional, and/or different components may be included. Media and data synchronization system (or system) 300 communicates with a computing device 305 of an end user through a network 310. Although a plurality of computing devices may communicate with system 300, only a single computing device 305 is shown in FIG. 3 for illustrative purposes. Network 310 can be a local area network, a wide area network such as the Internet, a wired or wireless telecommunications network, a television network, a radio network, and/or any other medium through which information can be sent and received.

Media and data synchronization system 300 includes a media generator 315, a data generator 320, a timestamp generator 325, a statistical database 330, a server 335, a memory 340, a processor 345, a cache 350, a data servlet 355, and a stringer application 360. In alternative embodiments, system 300 may include fewer, additional, and/or different components. In an illustrative embodiment, one or more of the components of media and data synchronization system 300 may be located at a different location than other components. In such an embodiment, the distributed components can communicate with one another and share information through network 310. Media generator 315 can include video cameras, microphones, and/or other capture devices for generating media corresponding to a program.

Stringer application 360 can be used to automatically receive information regarding a program from a pitch tracker, an individual monitoring the game, and/or other sources. Data generator 320 is configured to receive information from stringer application 360 to generate data corresponding to the program. Data generator 320 may also associate data timestamps with the data. Statistical database 330 can include information such as current season player statistics, career player statistics, team statistics, etc. In an illustrative embodiment, statistical database 330 can also be used by data generator 320 to generate at least a portion of the data. Statistical database 330, which may be remotely located from data generator 320, can be accessed through network 310.

Timestamp generator 325, which is in communication with both media generator 315 and data generator 320, is used to generate timestamps that are associated with the media and the data. In an alternative embodiment, separate timestamp generators may be used to generate the data timestamps and the media timestamps. In one embodiment, media generator 315, data generator 320, and timestamp generator 325 may be located at a venue of the program. The remaining components of system 300 may also be located at the venue. Alternatively, the remaining components of system 300 may be remotely located from the venue and configured to communicate with media generator 315, data generator 320, and timestamp generator 325 through network 310.

Server 335 can be used to make the generated media and data available through network 310. In an illustrative embodiment, computing device 305 of the end user can directly or indirectly interact with server 335 to receive a presentation of the program. In one embodiment, server 335 may include a media player that presents the program to through a network browser of computing device 305.

Memory 340 can be any type of computer memory or electronic storage device known to those of skill in the art. Memory 340 can be used to store media, data, timestamps, timelines, and/or any other information regarding a program. Memory 340 can also be used to store computer-readable instructions that, if executed, cause system 300 to perform any of the operations described herein for presenting a program. Cache 350 is used to cache the data associated with a program until it is determined that such data is to be presented. The data may also be stored in memory 340, as flat files on a disk, and/or in other locations. Processor 345, which can be any type of computer processing component known to those of skill in the art, can be configured to communicate with and/or control any of the other components of system 300. Processor 345 is also configured to execute the computer-readable instructions that form the system software. Data servlet 355 is configured to receive a current media timestamp, compare the current media timestamp to the data timestamps stored in cache 350, identify the data which has a greatest (or largest) data timestamp that is less than or equal to the current media timestamp, and retrieve the data for provision to computing device 305. In an alternative embodiment, data servlet 355 may be part of and/or incorporated into server 335.

Computing device 305 of the end user can be a laptop computer, a desktop computer, a cellular phone, a gaming device, a personal digital assistant, and/or any other device capable of receiving information through network 310. Computing device 305 includes a user interface 365, a media player 370, a display 375, a memory 380, a transceiver 385, and a processor 390. In alternative embodiments, computing device 305 may include fewer, additional, and/or different components. User interface 365 can include a computer mouse, a keyboard, a display, a touch screen, a touch pad, and/or any other component that allows the end user to interact with computing device 305 and request a program from system 300. Media player 370 can present the program to the end user on display 375. In an illustrative embodiment, media player 370 is a software application that is configured to synchronize the presentation of media and data using media timestamps and data timestamps as described herein. In an alternative embodiment, the media player may be included in system 300. In such an embodiment, the end user can access the media player through a network browser.

Memory 380 of computing device 305 can be used to store media player 370, a network browser through which the end user interacts with system 300, and/or any other code or software components of computing device 305. In one embodiment, memory 380 may also include a cache memory that is used to cache data until it is determined that the data can be presented. Transceiver 385 can be used to communicate with system 300 through network 310. Transceiver 385 can be any type of transmitting and/or receiving component known to those of skill in the art. Processor 390 can be used to execute the programs stored in memory 380. Processor 390 can also be used to control transceiver 385 and to provide interaction between all of the components of computing device 305.

The embodiments referenced herein have been described primarily with regard to baseball. It is important to understand that the disclosed embodiments are not limited to baseball. The illustrative embodiments can be used in conjunction with virtually any program that is presented to an end user and that may include both media and data, including other sporting events, television game shows, television reality shows, competitions, etc. It is also important to understand that the embodiments described herein may be implemented as computer-readable instructions stored on a computer-readable medium. Upon execution by a processor or other computer hardware, the computer-readable instructions can be configured to perform any of the operations described herein.

One or more flow diagrams have been used herein. The use of flow diagrams is not meant to be limiting with respect to the order of operations performed. The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method for synchronizing information, comprising:
   generating, by a media and data synchronization system comprising one or more processors, media that includes video corresponding to a program;
   generating, by the media and data synchronization system, data corresponding to the program, wherein a plurality of data timestamps are associated with the data;
   inserting, by the media and data synchronization system, a plurality of media timestamps into the media;
   transmitting, by the media and data synchronization system to a computing device via a computer network, at least a portion of the media for presentation on the computing device;
   receiving, by the media and data synchronization system from the computing device via the computer network, a request for data corresponding to currently playing media that is currently being presented on the computing device, wherein the request comprises a current media timestamp corresponding to the currently playing media;
   performing, by the media and data synchronization system, a comparison between the current media timestamp inserted in the currently playing media that is currently being presented on the computing device and the plurality of data timestamps associated with the data;
   identifying, by the media and data synchronization system, based at least in part on the comparison between the current media timestamp inserted in the currently playing media that is currently being presented on the computing device and the plurality of data timestamps associated with the data, data having a greatest data timestamp that is less than or equal to the current media timestamp to prevent the data corresponding to an event that occurs in the program from being presented prior to the media corresponding to the event; and
   transmitting, by the media and data synchronization system to the computing device via the computer network, responsive to the request, the identified data, which was identified based on the comparison between the current media timestamp and the plurality of data timestamps, for presentation on the computing device together with the currently playing media that is currently being presented on the computing device,
   wherein each of the plurality of media timestamps is automatically inserted into the media based on the occurrence of a respective event that occurs during the program such that data corresponding to the respective event can be obtained.

2. The method of claim 1, wherein the data includes a graphical simulation of the event.

3. The method of claim 1, wherein the current media timestamp results from rewinding or fast forwarding of the portion of the media.

4. The method of claim 1, further comprising associating the plurality of media timestamps with the media based at least in part on events of the program.

5. The method of claim 1, wherein the program comprises a baseball game, wherein the identified data relates to a pitch thrown in the baseball game, and wherein the identified data includes a statistic regarding a pitcher that threw the pitch.

6. The method of claim 5, wherein the statistic comprises a season statistic or a career statistic that is updated as a result of the pitch.

7. The method of claim 1, further comprising generating a timeline that includes links to a plurality of events from the program, wherein each event includes event media having an associated media timestamp and event data having an associated data timestamp.

8. The method of claim 1, wherein at least a portion of the data comprises information that originates from a social networking site.

9. The method of claim 1, further comprising encoding the one or more media timestamps into the media as metadata.

10. The method of claim 1, further comprising:
    storing the generated data in a cache memory at the media and data synchronization system; and
    based on the comparison, retrieving the identified data from the cache memory.

11. The method of claim 1,
    wherein the plurality of media timestamps are inserted into the media only at positions of the media for which the data is generated.

12. The method of claim 1, wherein the data identified by the media and data synchronization system has a greatest data timestamp that is less than the current media timestamp.

13. A system for synchronizing information, comprising:
    a media and data synchronization system comprising one or more processors coupled to memory, the media and data synchronization system configured to:

generate media that includes video corresponding to a program;

generate data corresponding to the program, wherein a plurality of data timestamps are associated with the data;

insert a plurality of media timestamps into the media;

transmit, to a computing device, at least a portion of the media for presentation on the computing device;

receive, from the computing device, a request for data corresponding to currently playing media that is currently being presented on the computer device, wherein the request comprises a current media timestamp corresponding to the currently playing media;

perform a comparison between the current media timestamp inserted in the currently playing media that is currently being presented on the computing device and the plurality of data timestamps associated with the data;

identify, based at least in part on the comparison between the current media timestamp inserted in the currently playing media that is currently being presented on the computing device and the plurality of data timestamps associated with the data, data having a greatest data timestamp that is less than or equal to the current media timestamp to prevent the data corresponding to an event that occurs in the program from being presented prior to the media corresponding to the event; and transmit, to the computing device, in response to the request, the identified data, which was identified based on the comparison between the current media timestamp and the plurality of data timestamps, for presentation on the computing device together with the currently playing media that is currently being presented on the computing device, wherein each of the plurality of media timestamps is automatically inserted into the media based on the occurrence of a respective event that occurs during the program such that data corresponding to the respective event can be obtained.

14. The system of claim 13, wherein at least the portion of the media and the identified data are presented while the program is on-going.

15. The system of claim 13, further comprising a capture device configured to generate the media.

16. The system of claim 13, wherein the plurality of data timestamps are generated based at least in part on a time that the data is entered into a stringer application.

17. The system of claim 13, wherein the current media timestamp is received from a media player application of the computing device.

18. The system of claim 13, further comprising a timestamp generator configured to generate at least the plurality of media timestamps.

19. The system of claim 13, further comprising a cache memory configured to store the data.

20. The system of claim 13, wherein the plurality of media timestamps are inserted into the media only at positions of the media for which the data is generated.

21. A method for presenting a program, comprising:

receiving, by a receiver of a computing device via a computer network from a system, media that includes video corresponding to a program, wherein a plurality of media timestamps are inserted into the media by the system;

presenting the media through a media player application;

transmitting, from the media player application, a request for data corresponding to currently playing media that is currently being presented on the computing device to the system, wherein the request comprises a current media timestamp corresponding to the currently playing media;

receiving, by the receiver of the computing device from the system via the computer network, in response to the transmitting of the request, data corresponding to the currently playing media for presentation on the computer device together with the currently playing media that is currently being presented on the computing device, wherein the received data was identified by the system based on a comparison between the current media timestamp inserted in the currently playing media that is currently being presented on the computing device and a plurality of data timestamps associated with data corresponding to the program, the identified data having a greatest data timestamp that is less than or equal to the current media timestamp so as to prevent the data corresponding to an event that occurs in the program from being presented prior to the media corresponding to the event; and presenting the data corresponding to the currently playing media through the media player application, wherein each of the plurality of media timestamps is automatically inserted into the media based on the occurrence of a respective event that occurs during the program such that data corresponding to the respective event can be obtained.

22. The method of claim 21, wherein the plurality of media timestamps are inserted into the media only at positions of the media for which the data is generated.

* * * * *